Oct. 18, 1966  H. J. MODREY  3,279,302
QUICK RELEASE PANEL FASTENER
Filed Aug. 11, 1964

INVENTOR.
HENRY J. MODREY
BY
ATTORNEYS

United States Patent Office 3,279,302
Patented Oct. 18, 1966

3,279,302
QUICK RELEASE PANEL FASTENER
Henry J. Modrey, Eagle Drive, Stamford, Conn.
Filed Aug. 11, 1964, Ser. No. 388,779
20 Claims. (Cl. 85—70)

The present invention relates to quick release panel fasteners of the kind in which a headed stud supports a lengthwise compressible elastic sleeve, a cam abutting against the sleeve face opposite the stud head and a cam follower coacting with the camming surface of the cam. Fasteners of this kind are mounted in a hole in a panel and are locked to a suitably dimensioned hole in a second panel or support structure by turning the stud and with it the cam follower so that the latter will ride from a low part of the camming surface to a higher part thereof. The resulting lengthwise shortening and corresponding outward bulging of the sleeve cause the latter to overhang the mounting hole, thereby securing the fastener in the same and securing the panel to the second panel or support structure. Release of the fastener is effected by turning the cam follower thereof from its high position on the camming surface into a lower position, whereby the sleeve will re-expand lengthwise and radially contract. Both the stud hole in the removable panel and the mounting hole in the second panel or support structure are of circular configuration, and no anchoring means need be provided to prevent the fastener from idling in relation to the panel. The sole anchoring means are afforded by the friction of the rubber sleeve against the underside of the removable panel and against that of the camming member, respectively. Fasteners of this kind have the advantage that they are shock and vibration proof when locked.

With fasteners of this kind as heretofore known the cam follower is in the form of a solid pin or a rolled pin fitted in a transverse bore of a stud portion protruding from the cam and secured in the stud against lateral displacement by a notch or set-off in the middle portion of the pin. The aforementioned sleeve is slightly precompressed so as to press the notched or set-off portion of the pin against the adjacent stud wall portion, and also to provide starting friction and to prevent idling of the cam when the stud is turned for locking the fastener. However, practical experience has shown that the mounting of a cam follower in the form of a loose pin is a time-consuming and tedious operation which generally must be carried out in two stages by the user of the fastener. In the first stage, following insertion of the stud through the panel hole, the sleeve must be temporarily compressed lengthwise to an extent such that the stud hole is fully uncovered and clear of the cam member. In the second stage the loose pin is inserted, and such insertion must be effected in a definite angular position of the pin in reference to the stud, to wit, so that the notched or set-off portion of the pin faces upwardly, as otherwise the pressure of the sleeve will not retain the pin in the stud. This requires considerable dexterity, especially since in practice the pin is generally very small. Even though special tools and jigs have been developed for compressing the sleeve so as to uncover the stud hole, the assembly of fasteners of the afore-described kind using a set-off or notched pin as cam follower remains a time-consuming and correspondingly costly operation. As the fasteners are a low cost, mass production device, the cost factor of the installation is of paramount importance to the user. Moreover, the notched cam follower tends occasionally to fall out and thereby to disassemble the whole fastener when the edge of the cam is accidentally knocked during insertion. This compresses the sleeve temporarily, with the result that the spring pressure which secures the notched pin is temporarily interrupted, thus permitting the notched pin to fall out.

It is an object of the present invention to provide a novel and improved quick release fastener which has no loose, separate parts and which embodies in effect its own precompression tool for assembly. To attain this object, the afore-described cam follower in the form of a notched or set-off pin is replaced by a cam follower which when turned from an initial or assembly position on the stud automatically effects the temporary shortening of the sleeve required for positioning the cam follower and subsequently comes to rest in its operational position on the cam.

Another object of the invention is to provide a novel and improved quick release fastener the cam follower of which is not directly secured to the stud, but is mounted on the same by means of a smooth cylindrical pin which can be simply pressed into a cross hole in the stud without regard to the angular position of the pin, and which is automatically secured in its lateral position upon placement of the cam follower in its operational position, thereby preventing accidental falling out of the mounting pin due to shock and vibration.

A still further object of the invention is to provide a novel and improved quick release fastener the cam follower of which, when placed in its operational position, is automatically retained in such position and secured against lateral displacement, regardless of temporary interruptions of the spring force exerted by the precompression sleeve.

A still further object of the invention is to provide a novel and improved quick release fastener the cam follower of which carries a cone-shaped guide member which assists the fastener in entering the hole in which it is to lock.

A still further object of the invention is to provide a novel and improved quick release fastener which is mounted in an auxiliary housing which can be fastened to a panel by pushing it through a hole in said panel, and which is capable of locking said panel to another panel or support member.

It is also an object of the invention to provide a novel and improved quick release fastener the cam follower of which has two independently acting safety features for locking the cam follower in its centered position in reference to the stud of the fastener, one of said features being effective when and while the fastener is installed in the locking hole of a panel, and the other feature when the panel mounting the fastener is locked to another panel or a similar support member.

Other and further objects, features and advantages of the invention will be pointed out hereinafter and set forth in the appended claims constituting part of the application.

In the accompanying drawing several preferred embodiments of the invention are shown by way of illustration, and not by way of limitation.

Figure 1:
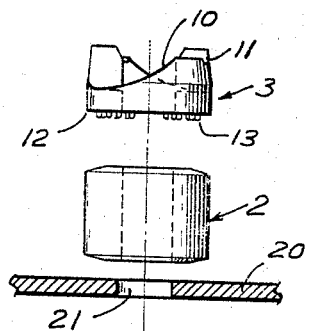
FIG. 1 is an exploded view of a quick release fastener according to the invention, and of a panel on which it is to be mounted.
Figure 1:
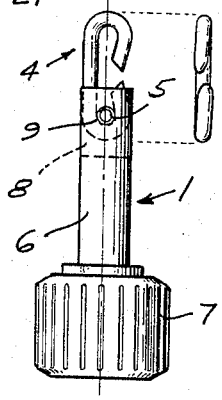

Referring first to FIGS. 1 through 5 in detail, the fastener as shown in these figures comprises a stud 1, a sleeve 2, a cam 3, a cam follower 4 and a pin 5.

Stud 1 comprises a stem 6. An operating head 7 is secured to one end of stem 6, or is integral therewith. The head may have any shape suitable for the particular use for which the fastener is intended. It is shown as a grooved plastic knob suitably fastened on stem 6. The other end of the stem terminates in a slot 8. The two branches or forks of the slotted stem portion each have a crosswise hole 9.

Sleeve 2 has a generally cylindrical configuration and is made of a suitable elastically deformable material, such as rubber or a plastic composition, so that the sleeve will be shortened and bulge out radially when subjected to lengthwise directed pressure, but will recover its original shape when the pressure is released.

Cam 3 is ring-shaped and is made of a suitable rigid material, such as plastic or metal. It has on one side a camming surface 10 which may extend throughout the entire circumference of the cam, but preferably two camming surfaces are provided, each extending through about 165°, as shown. An indentation 11 may be provided at substantially the high point of each camming surface to retain the cam follower in its highest position on the camming surface, followed by a ridge which acts as a stop to prevent turning past the highest position, for a purpose which will be more fully explained hereinafter. The opposite side 12 of the cam is flat. It may have pointed protrusions 13 for engagement with the respective face end of sleeve 2 for the purpose of increasing the friction between cam and sleeve.

The cam follower 4 is made of suitably bent, preferably springy wire and is formed with a loop 15 at each end. One of the long sides of the cam follower is interrupted. The free ends of the wire are slightly bent inwardly and may be slanted at 15a, so that the outer wire edges are closer to each other that the inner wire edges, thereby forming a pocket between the wire ends, for a purpose which will be more fully explained hereinafter. The cam follower may be slightly distorted in its general plane, as is clearly shown in FIG. 1. Slot 8 and crosswise holes 9 in the stud are so dimensioned that, in reference to the length of the cam follower and the thickness of the wire from which the cam follower is made, both branches of the loops 15 are contained within slot 8 and steadied therein by a slight pressure engagement with the side walls of the slot due to the distortion of the cam follower, but are still free to swivel within the slot. Such dimensioning of the cam follower prevents bending thereof when the fastener is tightened, as will be more fully explained hereinafter, thereby greatly increasing the torque resistance which the cam follower is capable of sustaining.

Pin 5 may be a solid pin or a rolled pin, as is shown. The pin may be made of steel or other suitable material and may fit the cross hole 9 with a comparatively loose fit, just sufficient to retain the pin in place during the assembly of the fastener.

The maximum width of each loop is greater than the diameter of pin 5, but narrows toward the slanted wire ends to a width equal to the diameter of the pin or slightly less.

The fastener is assembled on the detachable panel 20, and more specifically, in the mounting or locking hole 21 thereof. The diameter of the mounting hole is such that it fits the stem 6 of the stud, and the diameters of sleeve 2 and cam 3 are such that they fit stem 6.

To assemble the fastener, the stud, with cam follower 4 attached thereto by means of pin 5, is pushed through mounting hole 21 so that knob 7 abuts against one side of panel 20, and the stem 6 with the cam follower thereon protrudes from the other side. Sleeve 2 is now slipped on the stud, and finally cam 3. All the components are now in the position shown in FIG. 2. As may be observed, one of the loops 15 of the cam follower now extends partly into the center bore of cam 3. The cam is turned until the lowest portion of the camming surface intersects the general plane of the cam follower, as is clearly shown in FIG. 3.

Figure 2:
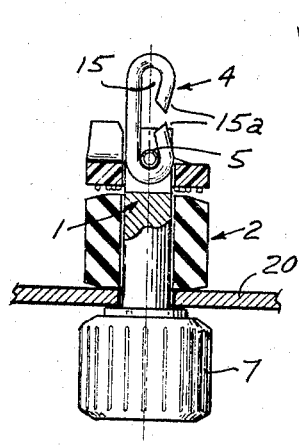
FIG. 2 shows the fastener of FIG. 1 partly assembled on the said panel.
Figure 3:
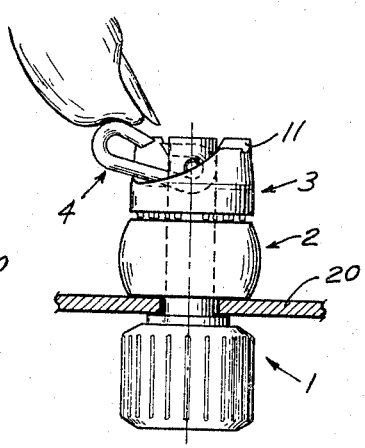
FIG. 3 shows the precompression stage of the assembly.
Figure 4:
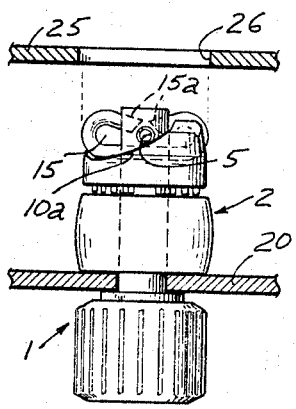
FIG. 4 shows the fastener fully assembled on said panel, ready for locking the panel to a second panel or support member.

To complete the assembly of the fastener the cam follower is forcibly turned from the upright position of FIG. 2, which constitutes the assembly position, into the transverse position of FIG. 4, which constitutes the operational position of the cam follower as formed by the loops. The turning of the cam follower proceeds in two clearly defined stages. As is evident from FIG. 3, in the first stage the loop respective acts as a lever pivoting about pin 5 and pressing cam 3 downwardly; that is, toward panel 20, thereby slightly shortening and compressing sleeve 2. When the cam follower has reached its horizontal position, it becomes possible to push it horizontally against the slight braking action of the cam, which is pushed upward by the precompressed sleeve, until the cam follower reaches the center position, when pin 5 snaps into the pocket formed by the ends 15a of the cam follower. In this position, the sleeve is still slightly compressed and thus maintains pressure against the cam, on which the cam follower now rests. This upward pressure secures pin 5 in the pocket in the manner of a spring-loaded click stop or latch, thereby effectively preventing lateral displacement of the cam follower during the opening and closing of the fastener and due to shock and vibration to which the fastener may be subjected when in use. The varying degrees of precompression of sleeve 2 are indicated by the extent of the bulge shown.

Due to the bent-down spring wire ends 15a of the cam follower, pin 5 becomes elastically wedged within the cam follower when the latter is horizontally displaced, thereby securing the pin in its position so that it will not fall out, for instance, during insertion of the fastener assembled on one panel into the locking hole of a second panel. As is apparent, this safety feature is independent of the pressure of the sleeve due to the compression thereof. As is further apparent, the narrowing space available for the pin within the cam follower forces the pin to lift the corresponding part of the cam follower as the same is turned from the upright position of FIG. 2 into the horizontal position of FIG. 4. As a result, the cam follower is urged toward its centered position, or in other words, the cam follower is self-centering and automatically latched in its centered position by the afore-described pocket formed by the bent wire ends of the cam follower.

When the cam follower is in its centered position, the pressure of the sleeve secures the pin in the pocket, thereby providing a second safety feature independent of the afore-described first one.

All the components now occupy the relative positions shown in FIG. 4. As is shown in the figure, pin 5 is now at least partly covered by the cam surface at 10a, thereby positively preventing any involuntary lateral movement of the pin, should it become loose.

The fastener is now ready to secure panel 20 to a second panel or support member 25. Panel 25 has a mounting or locking hole 26, the diameter of which fits sleeve 2 in its slightly precompressed state.

To secure panels 20 and 25 to each other, the two panels are brought into a superimposed abutting position, and stud 1 and with it cam follower 4 are rotated in reference to cam 3 by turning knob 7. As is evident from the previous description, the sleeve is in pressure engagement with panel 20 due to the precompression of the sleeve so that the sleeve and the cam will remain stationary when the stud is turned. Protrusions 13 at the underside of the cam are helpful in increasing the friction between cam and sleeve, but are not absolutely essential. Sufficient starting friction between the cam, the sleeve and panel 20 is obtained by slightly precompressing sleeve 2. This is achieved by correctly dimensioning the position of cross hole 9, having regard to the thickness of panel 20.

As a result of the turning of the stud, the cam follower will ride upwardly on the cam surfaces until it finally snaps into indentations 11, thereby causing a substantial shortening of sleeve 2. Stop ridges on the cam prevent turning past this "locked" position. The sleeve will now bulge outwardly in the manner indicated in FIG. 5, in which the sleeve overhangs the mounting opening 26 of panel 25, thereby locking the two panels to each other.

Figure 5:
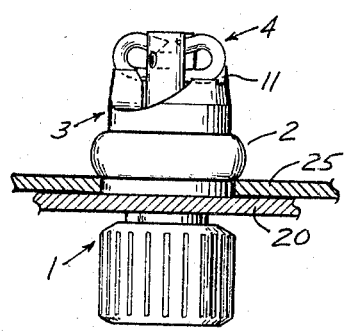
FIG. 5 shows the fastener in its locked condition, in which the two panels are secured to each other.

To release the fastener the cam follower is returned from the position of FIG. 5 into the position of FIG. 4 by turning the fastener in the opposite direction. The resulting lengthwise re-expansion of the sleeve restores the original shape of the sleeve and thereby removes the overhanging locking bulge. This permits withdrawal of panel 25. Disassembly of the fastener may be conveniently effected by reversing the steps described in connection with FIGS. 1 through 4.

Figure 6:
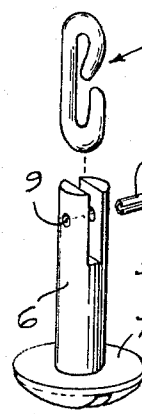
FIG. 6 shows an exploded view of a modified operating head of the fastener.

The fastener shown in FIG. 6 is identical to the one previously described, except that the plastic knob 7 is replaced by a screw head 7a secured to stem 6 of the stud.

Figure 7:
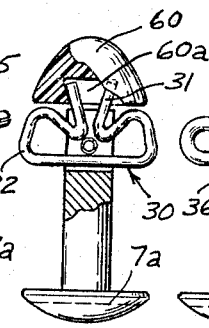
FIG. 7 shows a further modification of some of the components of the fastener, and in particular the attachment of a guide member for the insertion tip of the fastener.

FIG. 7 shows a quick release fastener provided with an entry guide 60 to facilitate entry of the fastener into its locking hole. It has been found that when a panel mounting fasteners near its corners or a substantial number of fasteners is to be locked to a supporting panel having corresponding locking holes, one or several fasteners may not readily slide into the locking holes in the supporting panel. In such case, the cams of the fasteners may strike against the rims of the locking holes in the supporting panel, whereby the cams may be damaged. The pressure upon a cam in engagement with the rim of a locking hole will compress sleeve 2, thus momentarily releasing the pressure of the sleeve by which the respective mounting pin 5 is retained in the pocket of the cam follower. However, with a fastener according to the invention, there is no danger that a pin thus released will fall out, since it is still retained by the action of the aforedescribed spring lock formed by the inwardly bent wire ends 15a of the cam follower.

Entry guide 60, preferably made of plastic or rubber, is generally cone-shaped. The side walls of the guide 60 and the wire portions 32 of cam follower 30 are preferably substantially in alignment, whereby the guide will smoothly direct the fastener into the locking hole of the supporting panel. The guide is secured to the fastener, and more specifically to the cam follower thereof, by providing in the guide a preferably keyed recess 60a which is engaged by springy horn-shaped extensions 31 of the cam follower.

Figure 8:
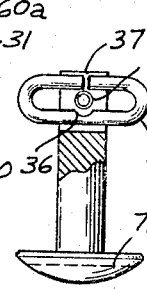
FIGS. 8 and 9 show further modified fastener components, and in particular a modified fastener stud and modified cam followers.

The fastener of FIG. 8 has a cam follower in the form of a double wire loop 35, one long side of which is notched on the inside at 36. As is evident, notch 36 corresponds in function to the pocket formed by wire ends 15a, in that engagement of mounting pin 5 with the notch will prevent lateral displacement of the cam follower, provided that the compressed sleeve maintains pressure against the assembly. As the inward turning or slanting of the wire ends of the loop is not needed in this modification, the wire ends may be left straight and be close to each other, as is shown in FIG. 8 at 37. Alternatively, the ends may be bent inwardly to provide spring stop action, as described in connection with the preceding figures.

Figure 9:
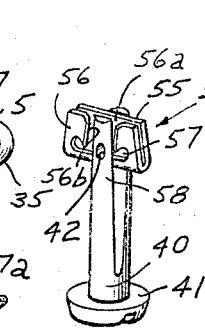

FIG. 9 has a stud in the form of a bifurcated rivet 40. The rivet terminates at one end a slotted head 41, and the two prongs of the rivet each include a cross hole 42 for insertion of mounting pin 5. Bifurcated rivets of this type may be inexpensively manufactured on special purpose machines, and are generally suitable as studs for fasteners according to the invention.

In the configuration shown in FIG. 9, the cam follower 50 of the fastener is formed of a strip of sheet metal which is doubled over to form two superimposed layers 55 and 56. Both layers include a lengthwise slot 57 widened at its ends so that the outline of the slot is similar to the inner outline defined by cam followers 4 or 30. Layer 56 is transversely slotted at 56a, and the edges defining slot 56a are slightly turned outwardly at 56b to form a pocket in which the branch 58 of the slotted stud portion is received when the cam follower is centered. In other words, slot 56a corresponds in function to the pockets of FIGS. 1 to 7 and the notch 36 of FIG. 8. The doubled-over metal strip firstly affords a well-rounded cam follower edge, and secondly exercises some spring pressure against the sides of the stud slot, which maintains the cam follower during assembly in an upright position corresponding to the position of the cam follower in FIG. 2.

The assembly and function of a fastener equipped with the cam follower of FIG. 9 are evident from the previous description.

Figure 10:
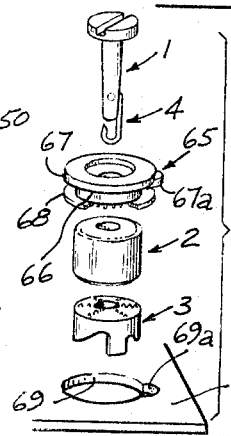
FIG. 10 shows an exploded view of a quick release fastener according to the invention for mounting in a housing which in turn can be rapidly attached to a removable panel.

FIG. 10 shows a quick release fastener similar to the kind shown in FIGS. 1–5 and described in connection therewith. However, fasteners of the kind shown in FIGS. 6–9 may also be used for the purpose of the structure according to FIG. 10.

While in the previously described figures the fastener is assembled on a panel, such as panel 20, the fastener of FIG. 10 is assembled on a housing 65, which may be made of a suitable plastic. The housing has a central cylindrical part 66 and flanges 67 and 68. Flange 68 has a diameter slightly greater than that of locking hole 69 in a panel 70, and is flexible to permit forcing of the flange through hole 69 so that the housing is retained on panel 70 by its two flanges. As is indicated, flange 68 may be thinner than flange 67 to provide the required flexibility. The length of the cylindrical portion 66 is selected in accordance with the gauge of panel 70, and the diameter of portion 66 fits locking hole 69. Flange 67 has a nose 67a which is set off in reference to the top side of the flange, as is clearly shown in FIG. 10, or extends below the bottom side of the flange. The nose is engageable with a recess 69a in panel 70 to prevent turning of the housing within the panel.

The assembly of the fastener components on the housing is evident from the previous description. While the attachment of the housing to the panel is floating and not positive, the panel is positively locked to its base once the fastener has been inserted and turned to the locked position. Assemblies as shown in FIG. 10 may be used, for instance, for securing the back covers of television sets or appliances.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A quick release fastener for locking in a locking hole of a support member, said fastener comprising a stud having an enlarged end at one end and a lengthwise slotted portion at the other end, an elastically deformable sleeve fitted upon said stud, with the said slotted stud portion protruding from the respective face end of the sleeve, a ring-shaped cam member fitted upon said protruding stud portion, the face side of said cam member opposite said sleeve having a camming surface, a cam follower fitted in said stud slot, said cam follower including an elongated slot, and a mounting pin extending across said slotted stud portion and through said slot for supporting the cam follower on the stud pivotable between an assembly position substantially aligned with the stud and an operational position crosswise thereto, the cam follower in its operational position engaging said camming surface for lengthwise shortening the sleeve by turning the stud together with the cam follower in the operational position thereof into a predetermined direction in reference to the camming surface, said shortening of the sleeve causing an outward bulging thereof, thereby locking the fastener in said locking hole.

2. A fastener according to claim 1, wherein the maximum crosswise width of said cam follower fits within the inner diameter of said cam member to permit fitting of the sleeve and the cam member upon the stud in said aligned position of the cam follower.

3. A fastener according to claim 1, wherein said cam follower comprises an elongated wire structure having a loop at each end joined by intermediate wire portions, said loops and said intermediate wire portions defining said elongated slot of the cam follower.

4. A fastener according to claim 1, wherein said cam follower comprises an elongated wire structure having a loop at each end joined by intermediate wire portions, said loops and said intermediate wire portions defining said elongated slot of the cam follower, one of said intermediate wire portions being interrupted and bent inwardly at each end to form a pocket engageable with the mounting pin in a centered position of the cam follower in reference to said stud, thereby to retain the cam follower in said position and the pin in the stud.

5. A fastener according to claim 4, wherein the maximum crosswise inner width of the slot at said loops is greater than the diameter of said pin and substantially equal to the diameter of the pin at said inwardly bent wire ends defining the pocket.

6. A fastener according to claim 1, wherein said cam follower comprises an elongated wire structure having a loop at each end joined by intermediate wire portions, said loops and said intermediate wire portions defining said elongated slot, one of the long sides of said slot including a notch engageable with said mounting pin in the operational position of the cam follower for maintaining the latter in a centered position in reference to the stud.

7. A fastener according to claim 1, wherein said cam follower is formed of sheet metal including said elongated slot.

8. A fastener according to claim 7, wherein one of the long sides defining said slot includes a notch engageable with said mounting pin in said operational position of the cam follower for retaining the latter in a centered position in reference to the stud.

9. A fastener according to claim 1, wherein said cam follower is formed of superimposed layers of sheet metal including said elongated slot, an outer one of said layers being slotted transversely of said elongated slot, one branch of said slotted stud portion being engaged with said transverse slot, whereby the respective layer edges retain the cam follower in a centered position in reference to the stud.

10. A fastener according to claim 1, wherein said cam follower is formed of sheet metal including said elongated slot, the length of said slot in relation to the length of the stud slot providing for pivoting of the cam follower between said aligned assembly position and said crosswise operational position.

11. A fastener according to claim 1, wherein the face side of the cam adjacent to said sleeve is formed with protrusions engageable with the sleeve to impede rotation of the cam member and the sleeve in reference to each other upon rotation of said stud.

12. A fastener according to claim 1, wherein said stud is in the form of a bifurcated rivet, each of the prongs of the rivet having a crosswise bore therethrough, said mounting pin extending through said bores.

13. A fastener according to claim 1 and comprising an entry guide fitted upon said cam follower and having a maximum cross-sectional outline substantially covering the crosswise width of said cam follower in the operational position thereof for guiding the fastener into said locking hole.

14. A fastener according to claim 13, wherein said entry guide comprises a generally cone-shaped body having a recess in its flat side, and wherein said cam follower comprises extensions engaging said recess for securing the guide to the cam follower and thereby the stud.

15. A quick release fastener for locking in a mounting hole of a support member, said fastener comprising a stud having an enlarged head at one end and a lengthwise slotted portion at the other end, an elastically deformable sleeve fitted upon said stud, said slotted stud portion protruing from the respective face end of the sleeve and including a crosswise hole, a ring-shaped cam rotatably fitted upon said protruding stud portion, the face side of the cam member opposite the sleeve having a camming surface, an elongated cam follower fitted in said stud slot, the maximum lengthwise width of said cam follower fitting the inner diameter of the cam member, and a mounting pin inserted in said crosswise hole of the slotted stud portion extending across said slot and through the cam follower fitted into the same for supporting the cam follower, and pivotable between an assembly position substantially aligned with the slot and an operational position substantially crosswise thereof, said cam follower in its assembly position protruding into the cam member and in its operational position engaging said camming surface for coaction therewith, pivoting of the cam follower from its assembly position into its operational position about said pin effecting a lengthwise displacement of the cam member toward the stud head and a corresponding shortening of the sleeve, whereby the sleeve and the cam member are forced into pressure engagement with each other and the pin is retained in the stud, turning of the stud and with it of the cam follower in the operational position of the latter into a predetermined direction in reference to the cam member causing the cam follower to ride up on the camming surface, thereby effecting a further shortening and a corresponding outward bulging of the sleeve to lock the fastener in said locking hole.

16. A fastener according to claim 15, wherein the ends of said mounting pin are at least partly covered by the adjacent portions of said camming member in the operational position of the cam follower, thereby locking the pin in the stud hole.

17. A fastener according to claim 1 for assembly in a mounting hole of a substantially plate-shaped support member, and comprising a generally cylindrical housing, said stud extending through said housing coaxially therewith and protruding from the housing with its slotted portion, said housing having a central portion fitting said mounting hole and being of an axial length substantially matching the gauge of said plate-shaped support member, and two end flanges for retaining the housing on said member.

18. A fastener according to claim 17, wherein one of said flanges is flexible for forcing said flange through said mounting hole.

19. A fastener according to claim 17, wherein one of said flanges has an outwardly extending protrusion and the rim defining said mounting hole in said member has a recess engageable with said protrusion to prevent rotation of the housing in reference to the support member.

20. A method of assembling a quick release fastener comprising as components a stud headed at one end and slotted lengthwise at the other end, said slotted end having a crosswise hole therethrough, an elastically deformable sleeve, a ring-shaped cam member having on one face side a camming surface, a cam follower having a maximum width fitting the inner diameter of said cam member, and a mounting pin fitting said stud hole; said method comprising the steps of slipping the sleeve upon the stud, inserting the cam follower into said slotted stud end in substantial alignment with the stud, inserting the pin into the stud hole to retain the cam follower on the stud in said aligned position thereupon, slipping the cam member with its camming surface facing outwardly upon the stud past the aligned cam follower, the combined axial length of the sleeve and the cam member being such that the cam follower protrudes partly from the cam member, and turning the cam follower from said aligned position into a position crosswise of the stud against the counterpressure of the elastic sleeve, the cam follower in said crosswise position being engaged with said camming surface.

References Cited by the Examiner
UNITED STATES PATENTS 2,278,217  3/1942  Rodanet _____ 85—70
2,688,894  9/1954  Modrey _____ 85—70

FOREIGN PATENTS 108,988  2/1925  Switzerland.

WILLIAM FELDMAN, *Primary Examiner.*

E. SIMONSEN, *Assistant Examiner.*